United States Patent [19]
Pisoni

[11] 3,779,685
[45] Dec. 18, 1973

[54] ROTARY MACHINE FOR CONTINUOUSLY MOLDING AND PRESSING SOAP CAKES

[76] Inventor: Ottorino Pisoni, Viale Diaz, Busto Arsizio, Italy

[22] Filed: Sept. 7, 1971

[21] Appl. No.: 178,154

[30] Foreign Application Priority Data
Sept. 8, 1971 Italy.............................. 29494 A/71

[52] U.S. Cl.................................. 425/236, 425/341
[51] Int. Cl............................................. B28b 15/00
[58] Field of Search.................... 425/161, 168, 215, 425/236, 289, 299, 340, 341, 344, 345, 392, 395, 348, 397, 398, 399, 400, 129, 162, 171, 259, 298, 352, 406, 408, 432, 440, 441

[56] References Cited
UNITED STATES PATENTS

| | | | |
|---|---|---|---|
| 2,965,946 | 12/1960 | Sweet | 425/400 X |
| 991,035 | 5/1911 | Smith | 425/236 X |
| 806,967 | 12/1905 | Forster | 425/236 X |
| 1,231,693 | 7/1917 | Becker | 425/400 X |
| 1,796,253 | 3/1931 | Jones | 425/168 |
| 2,718,683 | 9/1955 | Mueller | 425/215 X |
| 2,969,753 | 1/1961 | Abbe | 425/215 X |
| 3,142,863 | 8/1964 | Mazzoni | 425/236 |
| 3,235,445 | 2/1966 | Hugentobler | 425/259 X |
| 3,348,266 | 10/1967 | Brown | 425/341 |
| 3,382,533 | 5/1968 | Fyfe | 425/236 X |

Primary Examiner—J. Spencer Overholser
Assistant Examiner—John S. Brown
Attorney—Karl F. Ross

[57] ABSTRACT

Soap cakes to be shaped in a mold are transported on a feeding conveyor to a loading zone of a rotary press where they are seized by grippers and placed on a lower die whose support forms part of a molding assembly rotating continuously about a vertical axis at the speed of the feeding conveyor which follows a path partly concentric with the orbit of the assembly. A plunger above the die support, forming part of the same assembly, carries an upper die which in a pressing zone descends onto the lower die to shape the soap cake deposited thereon. In an unloading zone, the shaped soap cake is transferred onto a discharge conveyor whose path is curved about the axis of rotation inside the orbit of the molding assembly. An array of six such assemblies are mounted on a pair of coaxial rings rotating therewith, these rings having teeth in mesh with the conveyors along the concentric portions of their paths. The conveyor speed therefore equals the speed of the molding assemblies along the loading and unloading zones, each of which extends over a quadrant of the assembly orbit whereas the pressing zone occupies two quadrants.

10 Claims, 5 Drawing Figures

Ottorino PISONI
INVENTOR

Karl G. Ross
Attorney

Ottorino PISONI
INVENTOR 3,779,685

ROTARY MACHINE FOR CONTINUOUSLY MOLDING AND PRESSING SOAP CAKES

FIELD OF THE INVENTION

This invention relates to a rotary machine for automatically and continuously molding and pressing soap cakes of any type and shape.

BACKGROUND OF THE INVENTION

Many types of machines for molding soap cakes are presently known; however, all of them have been designed and conceived for a batch operation and therefore their capacity and yield are far from being sufficient to meet the production capacities of modern, heavy-duty soap works.

OBJECTS OF THE INVENTION

The main object of this invention resides therefore in the provision of a novel high-yield machine for the molding and pressing of soap cakes, by which the requirements of most modern soap-making plants can be fully met.

Another object of the invention is the provision of a machine that allows, while keeping the production rate high, to maintain for a longer time the soap cake under pressure within the mold.

A further object of the invention resides in the provision of a machine whose overall dimensions, for a given output rate, are materially reduced with reference to those of conventional machines.

SUMMARY OF THE INVENTION

These objects are realized, in accordance with my present invention, by the provision of a feeding conveyor and a discharge conveyor each having a path arcuately curved, over part of its length, about a vertical axis which is the center of rotation of a plurality of molding assemblies whose orbit adjoins the path of the feeding conveyor along a loading zone and adjoins the path of the discharge conveyor along an unloading zone, these two zones being separated by a pressing zone extending over a substantial part of a circle. The conveyor speed equals that of the molding assemblies to facilitate transfer of oncoming soap cakes from the feeding conveyor to a lower die of each assembly in the loading zone and transfer of the pressed cakes from that die to the discharge conveyor in the unloading zone; this synchronism is maintained by coupling means comprising a pair of toothed rings, part of the supporting structure for the molding assemblies, meshing with the conveyors along their arcuate paths which lie outside the assembly orbit in the case of one conveyor (the feeding conveyor) and inside that orbit in the case of the other conveyor (the discharge conveyor). The transfer of the cakes, and the descent of an upper die of each assembly onto the associated lower die in the pressing zone, is controlled by a set of stationary cam tracks on a central column engaged by respective cam followers of the rotating assemblies.

BRIEF DESCRIPTION OF THE DRAWING

A preferred embodiment of a machine according to the invention is shown, as a nonrestrictive example only, in the accompanying drawing wherein.

SPECIFIC DESCRIPTION

Figure 1:
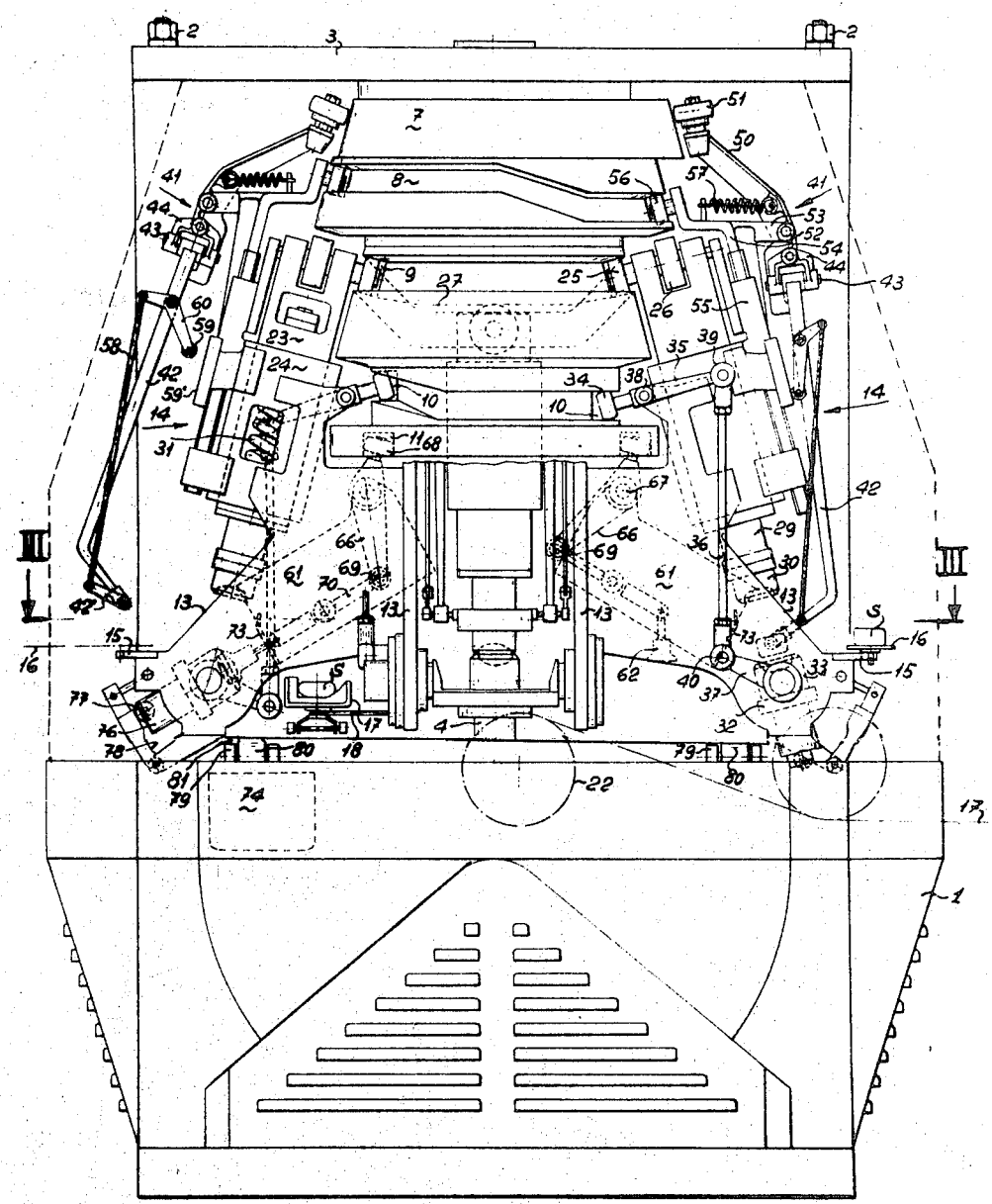
FIG. 1 is a diagrammatic overall front view of a machine in accordance with my invention, with parts broken away, showing at right a soap cake in the process of being transferred from a feeding conveyor to a lower die, at the center the pressing of a soap cake and at left the transfer of the soap cake from the die to a discharge conveyor.

The rotary molding machine shown in the drawing comprises a machine bed 1, here of rectangular cross-section. Supported on four uprights 2, extending from bed 1, is a top plate 3. A vertical main shaft 4, driven by a suitable prime mover (not shown) enclosed within the machine bed, rises centrally therefrom and is kept centered at its top by a ball bearing 5, fitted to top plate 3, while its lower end is retained by further suitable ball bearings or centering rollers and thrust bearings (not shown) mounted within the machine bed 1.

Rigid with the lower side of plate 3 is a tubular column 6 supporting a set of stationary cams 7, 8, 9, 10, 11 and 27 described in more detail later on, a suitable ball bearing 12 being secured to the lower end of column 6 for the centering thereof with respect to main shaft 4.

Rigid with the lower portion of main shaft 4, rising from machine bed 1, are six pairs of radially extending arms 13 each bearing a pressing unit generally indicated by the numeral 14. Connected with the outer ends of arms 13 is a horizontal toothed ring 15, designed to mesh with and drive a slot-type feeding conveyor 16 by which the raw soap cakes S are continuously fed to the machine. A slot-type discharge conveyor 17 is in mesh with and driven by a toothed ring 18 whose axis is offset with reference to that of main shaft 4. The ring 18 is peripherally supported by five ball bearings 19, fitted on posts 20 secured to bed 1, and driven by a crown gear 21, keyed to main shaft 4 and in mesh with an internal set of teeth of ring 18. A pair of guide rollers 22 let the conveyor 17 descend from the plane of toothed ring 18 to a lower level, allowing its inlet and outlet ends to enter and leave the machine bed 1.

Each pressing unit 13, supported by a pair of arms 13, comprises loading and unloading mechanisms, along with the pressing assembly proper.

This pressing assembly (see FIG. 4) essentially consists of a plunger 23 which can be axially moved within a sleeve 24, rigid with the arms 13, by means of a roller 25 running within the grooved stationary cam 9 carried on column 6. As specified later on, in the description of the operation, the proper pressing action is exerted by causing a roller 26, fitted on top of plunger 23, to run along cam track 27, also secured to column 6. Fitted within the mold member 23 is a stem 28 on whose outer end 29 an upper mold portion or die 30 is removably fitted, stem 28 being permanently urged outwardly by a spring 21 which is accommodated within a suitable seat formed in plunger 23.

Figure 4:
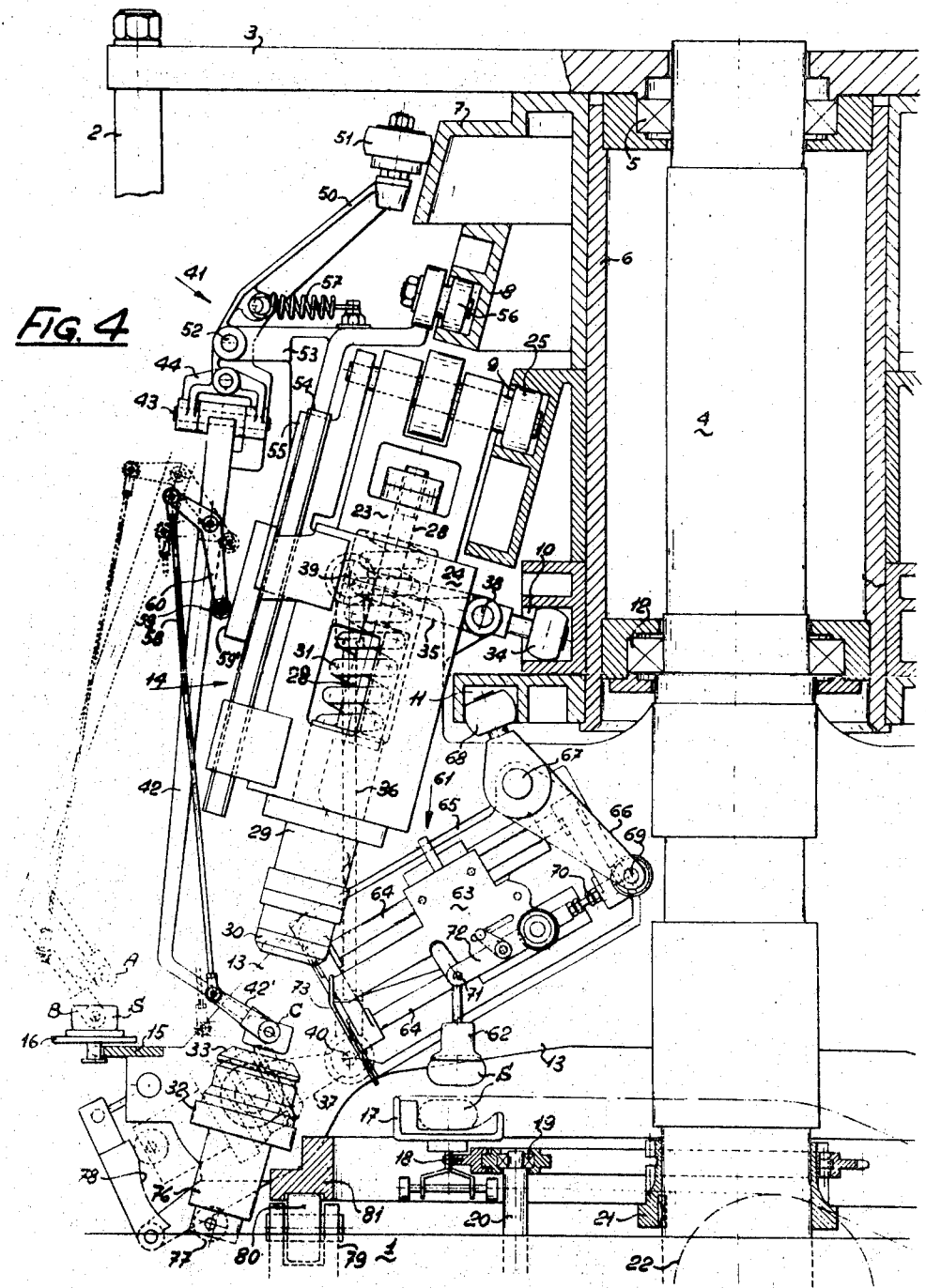
FIG. 4 is a partial longitudinal section of a pressing assembly and associated elements of the machine.

As clearly shown in the FIGS. 1 and 4, the common axis of plunger 23 and of stem 29 is inwardly and upwardly inclined, with reference to the axis of main shaft 4, to a predetermined extent, here at an angle of about 15°.

Crosswise pivoted to arms 13, below the plunger 23, is a mold support 32 onto which a lower mold portion or die 33 is removably fitted. The support 32 and the associated die 33 can be swung from a first position, wherein they are in a coaxial relationship with plunger 23, to a second position, wherein the common axis of support 32 and lower die 33 is inwardly and upwardly inclined, with reference to the axis of the main shaft 4, to a predetermined extent, i.e., at an angle of about 60° in the specific case illustrated. Such swinging from a first to a second position is caused by the stationary grooved cam 10, carried on the column 6, through a cam follower 34 and a system of levers 35, 36 and 37; the lever 35, carrying the cam follower 34, is pivotally connected at 38 with the sleeve 24 and hinged at 39 to one end of lever 36 whose opposite end is in turn pivotally connected, at 40, with the lever 37 fastened to mold support 32.

Figure 5:
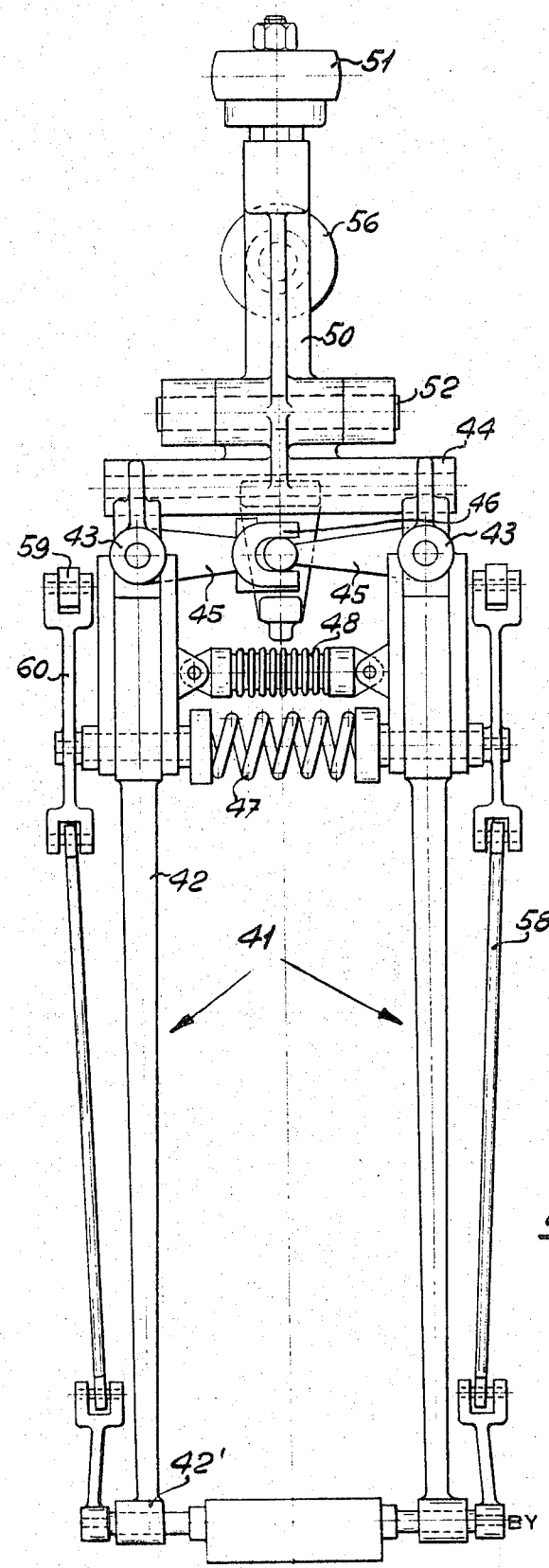
FIG. 5 is a front view of a detail of a gripper mechanism.

The loading mechanism (see FIGS. 4 and 5), denoted in its entirety by the reference numeral 41, essentially consists of two gripper arms 42, pivotally connected at 43 on a common bifurcate element or yoke 44 and connected with each other by an articulated linkage 45, 46. The grippers 42 are maintained in their spaced-apart position by a spring 47 interposed therebetween and can be brought close together, against the action of that spring, by a piston 48 of a pneumatic or hydraulic cylinder. The initial motion of gripper 42, for transferring a soap cake S from the feeding conveyor 16 to die 33, is downwardly directed and is followed by an inwardly directed swinging motion, as indicated by the positions A, B and C shown (the first two in broken lines) in FIG. 4.

The yoke 44 is secured to a bent arm 50, carrying a roller 51 fitted on its upper end and designed to cooperate with the stationary cam 7 which is secured to column 6. The whole system is pivotally connected, at 52, with a lug 53 integral with a slide 54 which can be reciprocated, along guides 55 fastened to sleeve 24, by the action of a cam follower 56 cooperating with the grooved stationary cam 8 which is formed integral with the column 6. The cam follower 51 of arm 50 is kept constantly engaged with the cam 7 by a suitable spring 57. Since the soap cake S is to be transferred from a horizontal plane, i.e., that of curved slat conveyor 16, to an inclined plane, i.e., that extending through the die 33, the jaws 42' of grippers 42 are to be slightly turned so as to deposit the soap cake S horizontally on the die 33. This task is performed by two rods 58, mounted alongside the gripper arms 42, by which the jaws 42' are turned from the position shown in broken lines in FIG. 4 to that shown in solid lines in the same Figure, by virtue of the engagement of a roller 59, on one end of a link 60 articulated to rod 58, with a cam track 59' which is formed on the sleeve 24.

Figure 2:
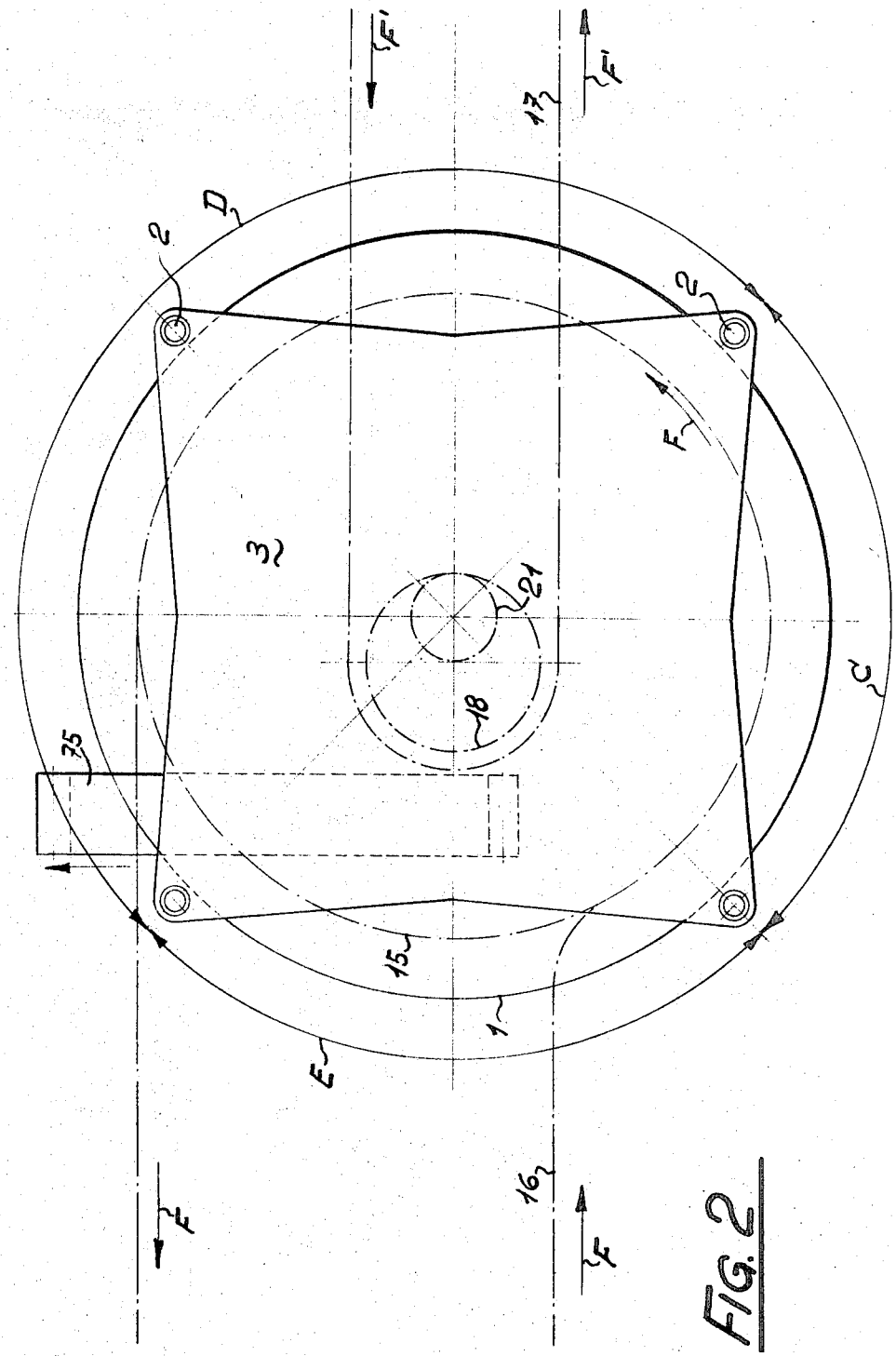
FIG. 2 is a diagrammatic plan view of the machine of FIG. 1.

The discharging device (see FIGS. 1 and 4), denoted in its entirety by the reference numeral 61, essentially consists of a suction head 62 which can be moved from a first position (shown in broken lines in FIG. 1), wherein it seizes the already pressed soap cake S from lower die 33, to a second position (shown in solid lines in FIG. 4) wherein this head is vertically above the discharge conveyor 17, thus performing actually a combined rotational and translational motion. In the embodiment shown, a slide 63 is reciprocable on guides 64 in a frame 65, fastened to arms 13, by a lever 66 pivotally connected to that frame at 67. Fitted on one end of lever 66 is a cam follower 68, designed to cooperate with the grooved cam 11 that is integrally formed with the column 6, while the opposite end of this lever is pivotally connected, at 69, with an extension 70 of slide 63. Suction head 62 is articulated, at 71, on a member 72 which is moved relatively to slide 63, when this slide is reciprocated, so as to bring the head 62 from a release position to a pick-up position in the course of forward and backward strokes, respectively, of slide 63. A vacuum is established within the head 62 when the soap cake S is to be picked up, and is relieved when the soap cake is to be released, by suitable devices (not shown). An end face of frame 65 carries a conventional trimmer 73 by which the burrs of flashes, which are formed all around the soap cake in the pressing step, are clipped and allowed to fall by gravity into a hopper 74 (see FIG. 1) wherefrom they are then discharged onto a band conveyor 75 (see FIG. 2) for recovery.

For the pressing of soap cakes S of the types that are formed with a peripheral fascia molding, the mold support 32 can be fitted with conventional knockout devices 76, operated through a cam 78 and a cam follower 77 by the rotary motion of support 32.

Fitted on the upper ends of uprights 79, vertically extending inside machine bed 1, are bearing rollers 80 designed to cooperate with a circular ring 81 fastened to the lower ends of pairs of arms 13, the bearing rollers 80 and the ring 81 being designed mainly to absorb the forces which arise in particular when the pressing step is performed, thereby preventing the arms 13 from being overstressed and/or deformed.

Finally, the machine is equipped with the usual pipings (not shown) for the circulation of mold-cooling water, as well as with the usual vacuum ducts (also not shown) for the operation of the suction heads.

OPERATION

Figure 3:
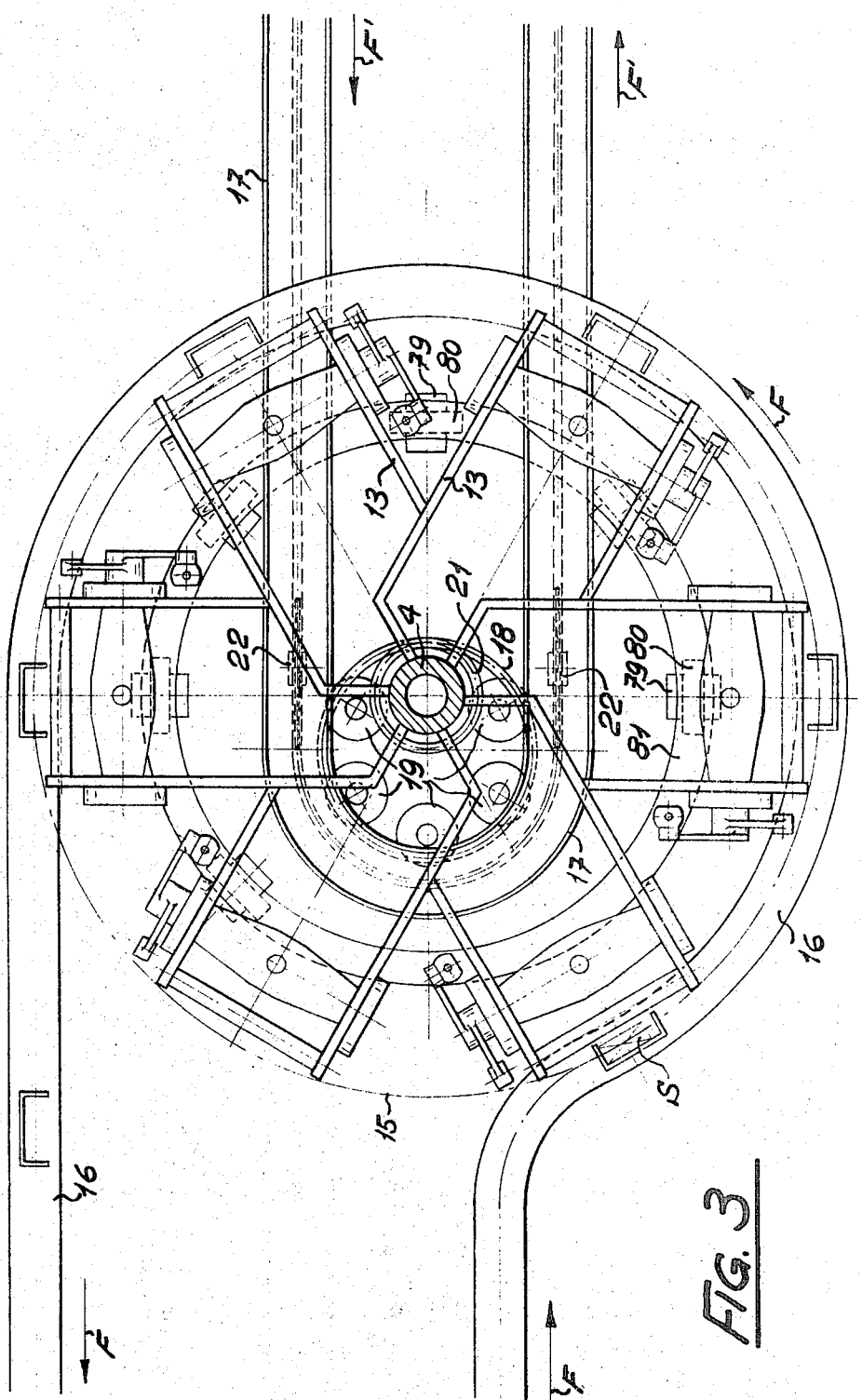
FIG. 3 is a diagrammatic section, taken on the line III — III of FIG. 1, showing the paths of the feeding and discharge conveyors.

From the description of the structure of my improved pressing machine it is manifest that the speed of loading conveyor 16 and of unloading conveyor 17 relative to the molds 33 is zero, since both of them are driven by the same rotary motion (at about 50 – 60 rpm). In particular, the loading conveyor is moved, outside the machine, in the direction of arrows F, while the discharging conveyor 17 is moved, inside the machine, in the direction of arrows F' (see FIGS. 2 and 3). Thus, single loading, molding and discharge zones (C, D and E, respectively) are formed wherein the different operations are performed by each molding assembly 14.

For a better understanding, the different operating steps of one molding assembly only will be described, since the operation of all other molding assemblies is performed continuously and in the same sequence.

Individual soap cakes S are continuously fed to the machine by the curved loading conveyor 16 whereon they are kept suitably spaced by special trays, entering the loading zone simultaneously with a molding assembly 14 revolving about the machine axis. At that instant (0°) all cams 7, 8, 9, 10, 11 and 27 are inoperative; the plunger 23 is in its lifted position, the support 32 is aligned with plunger 23, the loading devices 41 are in their outer position (as shown in broken lines in FIG. 4) and the discharging devices 61 are in their retracted position with vertically positioned suction head 62 (as shown in solid lines in FIG. 4). In the progress of rotary motion, the cams 7 and 8 start to operate whereby the loading devices are lowered (transfer from position A to position B, as shown in broken lines in FIG. 4). After the operation of piston 48, which results in the closing of grippers 42, devices 41 are lifted again up to position A and then swung into position C (see FIG. 4) whereby the soap cake is transferred from conveyor 16 to lower die 33. In the course of the last portion of this swinging motion, the cam follower 59 of link 60 is engaged with the cam track 59', thus causing the rods 58 to turn the gripper jaws 42' from the position shown in broken lines in FIG. 4 to the position shown in solid lines, thereby laying the soap cake S horizontally on the die 33. Simultaneously with this loading step, i.e., upon a rotation of about 45°, the cam 9 starts to operate, too, whereby the plunger 23 is lowered, bringing the upper die 30 to rest on soap cake S just before the soap cake is released by the grippers 42. The loading step is completed upon a rotation of about 90°, whereupon the pressing step at zone D is started by the action of cam 27; it should be noted that this pressing step is caused by the engagement of cam follower 26 with the cam 27, thus generating the required pressure which would otherwise be hardly attained by the coaction of cam follower 25 with cam 9 only; to prevent the cam 9 from interfering with the operation of cam 27, cam 9 is cut away in the pressing zone D.

The pressing step lasts from 90° to about 270° of rotary motion. Thus, zone D extends over two quadrants of the assembly orbit whereas each of zones C and E occupies one quadrant.

The discharge step at zone E starts directly at the end of pressing step at zone D. At the beginning of the discharge, the plunger 23 is lifted by the cam 9, the mold support 32 is tilted inwardly by the cam 10 and the discharging devices 61 are operated. It should be noted that the soap cake S is picked up by the suction head 62 only after the support 32 is wholly swung inwardly, the case being retained within the die 33 by the centrifugal force. In the course of the return stroke of slide 63, the flashes formed on soap cake S are clipped while the soap cake is passed through the calibrated trimmer 73, collected in the hopper 74 and discharged onto the scrap-conveyor band 75 to be recycled.

The above-described operating schedule concerns one assembly 14 only; however, thanks to the centrally symmetrical design of the machine, all assemblies 14 are continuously operated, i.e., each assembly starts to operate as soon as it enters the loading zone in the course of its rotation.

For constructional reasons I prefer to use mechanical means for the operation of different components of the machine; however, as can be readily appreciated, such mechanical means may be replaced by equivalent hydraulic and/or pneumatic means, and thus the invention is not restricted to the application of mechanical means as described and shown.

I claim:

1. A machine for the shaping of soap cakes, comprising:

a rotary structure centered on an axis, said structure including a plurality of molding assemblies describing a common orbit about said axis;

a feeding conveyor following a first path partly curved about said axis adjacent said orbit and concentric therewith along a loading zone;

a discharge conveyor following a second path partly curved about said axis adjacent said orbit and concentric therewith along an unloading zone separated from said loading zone by a pressing zone;

first transfer means on said structure adjacent each molding assembly operative in said loading zone for seizing an oncoming soap cake on said feeding conveyor, each molding assembly including normally open die means positioned to receive a soap cake from said first transfer means on approaching said pressing zone;

actuating means on said structure for closing said die means upon entry into said pressing zone and reopening said die means upon exiting from said pressing zone;

second transfer means on said structure adjacent each molding assembly operative in said unloading zone for delivering a pressed soap cake from said die means to said discharge conveyor;

coupling means between said structure and said conveyors for synchronizing the speed of said molding assemblies with that of said feeding conveyor throughout said loading zone and with that of said discharge conveyor throughout said unloading zone; and drive means for rotating said structure.

2. A machine as defined in claim 1 wherein the curved part of one of said paths adjoins said orbit externally whereas the curved part of the other of said paths adjoins said orbit internally.

3. A machine as defined in claim 2 wherein said coupling means comprises two annular sets of teeth on said structure respectively meshing with said feeding conveyor along said loading zone and with said discharge conveyor along said unloading zone.

4. A machine as defined in claim 3 wherein said structure includes an outer ring and an inner ring centered on said axis, said outer ring being externally provided with one of said sets of teeth, said inner ring being externally provided with the other of said sets of teeth.

5. A machine as defined in claim 4 wherein said drive means comprises a gear meshing with internal teeth on one of said rings.

6. A machine as defined in claim 4 wherein the teeth of said outer ring mesh with said feeding conveyor, the teeth of said inner ring meshing with said discharge conveyor.

7. A machine as defined in claim 1, further comprising stationary cam means centered on said axis and cooperating cam-follower means on said structure for operating said first and second transfer means and said actuating means.

8. A machine as defined in claim 1 wherein said axis is vertical, said die means comprising a lower die positioned to receive the soap cakes from said first transfer means and an upper die movable said actuating means into said lower die.

9. A machine as defined in claim 1 wherein said first transfer means comprises a pair of gripper arms with jaws closable around a soap cake, said second transfer means comprising a suction head.

10. A machine as defined in claim 1 wherein said loading and unloading zones each extend over substantially one quadrant of said orbit, said pressing zone extending over substantially two quadrants.

* * * * *

UNITED STATES PATENT OFFICE
CERTIFICATE OF CORRECTION

Patent No. 3,779,685   Dated 18 December 1973

Inventor(s) Ottorino PISONI

It is certified that error appears in the above-identified patent and that said Letters Patent are hereby corrected as shown below:

In the heading, line [30] read the priority data as:

-- Sept. 9, 1970    Italy    29494 A/70 -- .

Signed and sealed this 4th day of June 1974.

(SEAL)
Attest:

EDWARD M. FLETCHER, JR.
Attesting Officer

C. MARSHALL DANN
Commissioner of Patents